Figure 4:
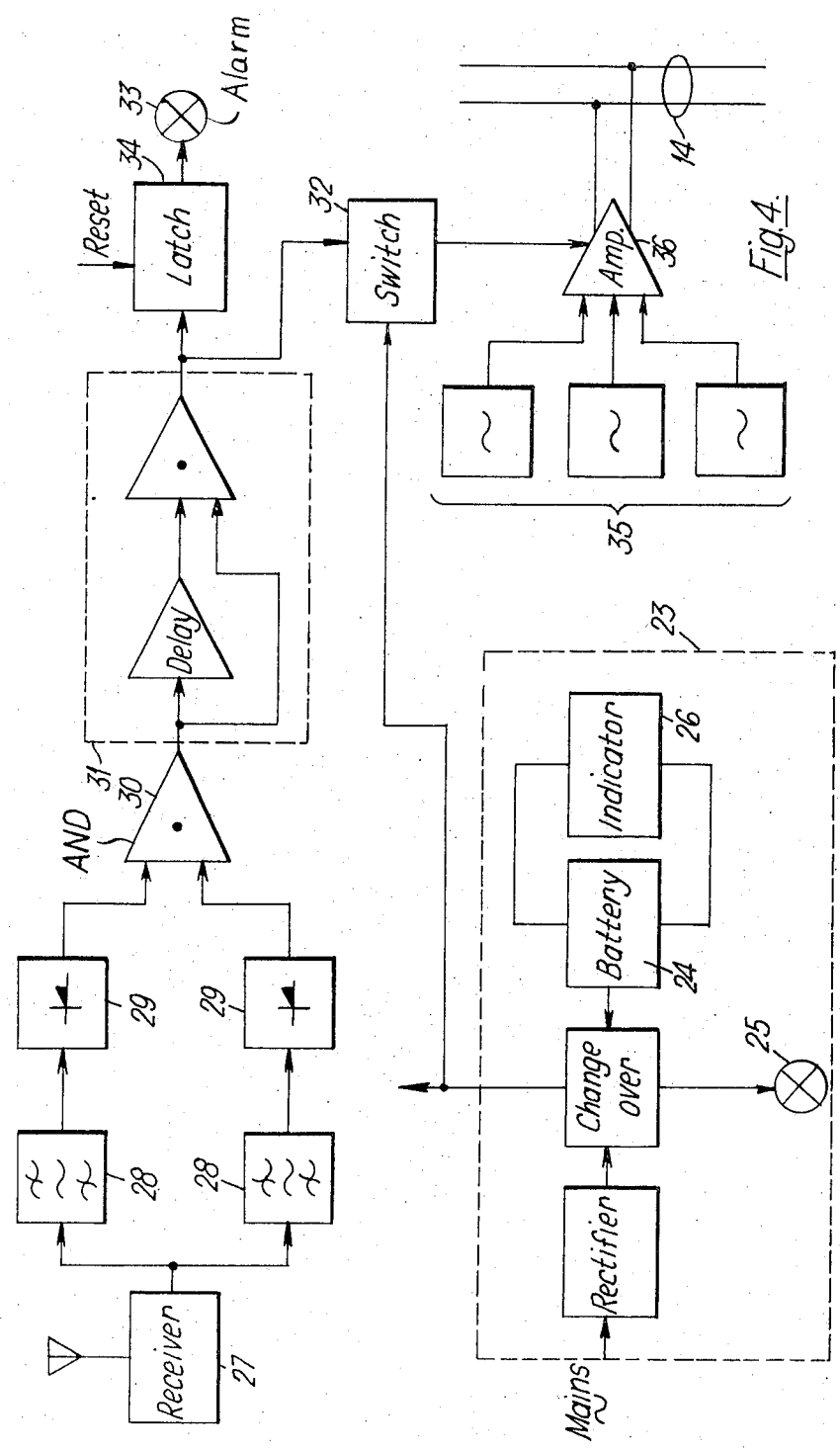

United States Patent [19]
Pappas

[11] 3,806,921
[45] Apr. 23, 1974

[54] DETECTOR DEVICE
[75] Inventor: Dennis Gerasimos Pappas, Sydney, Australia
[73] Assignee: Aboyne Pty Limited, Sydney, New South Wales, Australia
[22] Filed: Apr. 18, 1972
[21] Appl. No.: 245,148

[52] U.S. Cl. ............................ 340/412, 340/228 R
[51] Int. Cl. ..................... G08b 17/00, G08b 25/00
[58] Field of Search ............ 340/227 R, 228 R, 412

[56] References Cited
UNITED STATES PATENTS
3,192,506  6/1965  Henn .................................. 340/412
3,378,829  4/1968  Alafi ................................ 340/227 R
3,564,524  2/1971  Walthard ........................ 340/228 R
3,609,728  9/1971  Quinn .............................. 340/228 R
3,641,539  2/1972  Lesher ............................ 340/227 R

*Primary Examiner*—Thomas B. Habecker
*Attorney, Agent, or Firm*—Robert K. Rhea

[57] ABSTRACT

A detector/indicating system for employment, typically, in a fire alarm network; the system comprising a detector head which is actuable to generate and transmit a signal, and a remote receiver adapted to receive and give indication of signals transmitted by the detector head.

12 Claims, 6 Drawing Figures

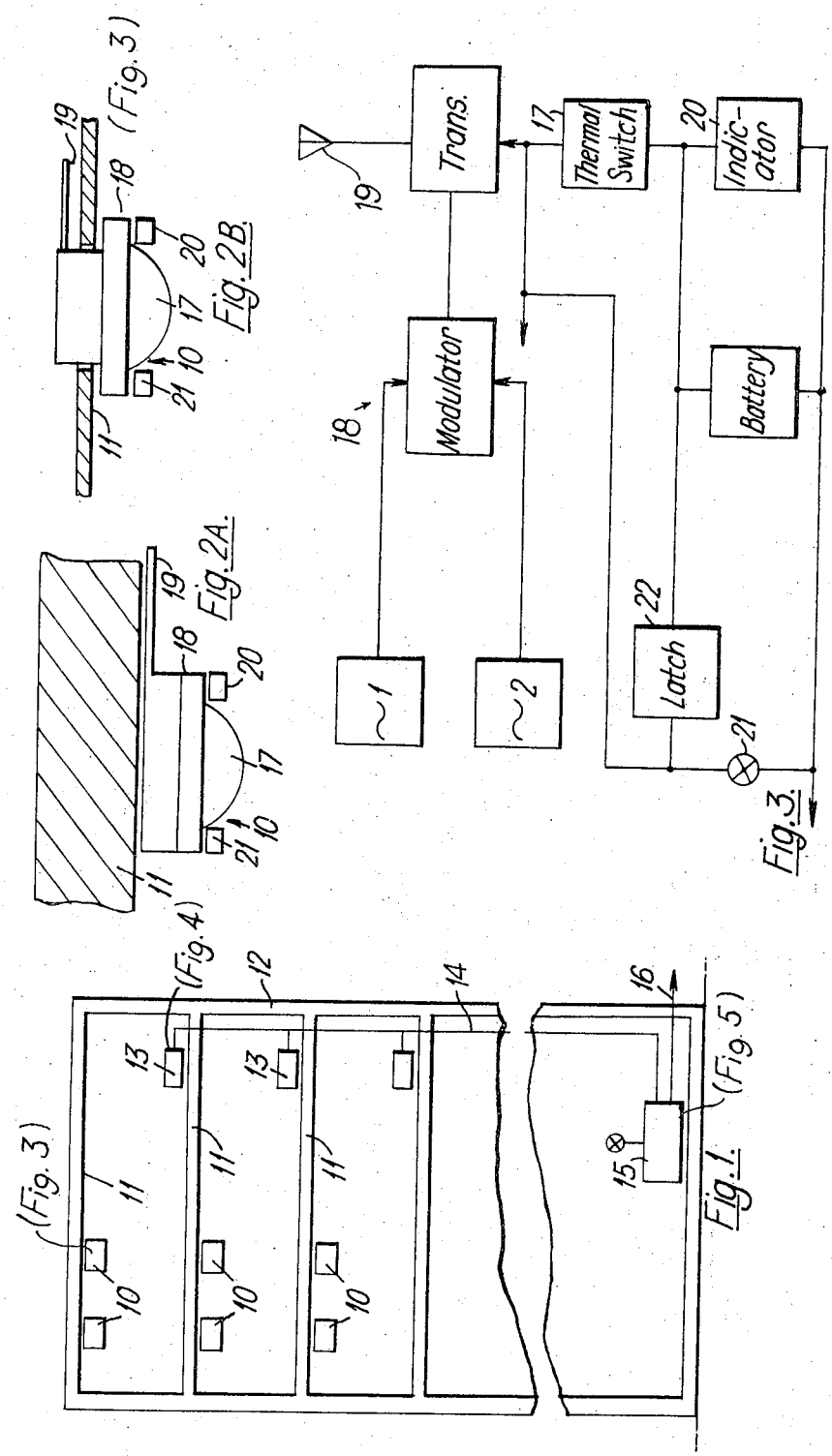

DETECTOR DEVICE

This invention relates to a detector device and, in particular, to an electronic detector device for detecting and giving indication of the existence of a predetermined thermal condition.

The device in accordance with the present invention (as below defined) has particular application in building fire detection and alarm systems.

There is thus provided in accordance with the present invention a detector head comprising a switching means actuable responsive to detection of a predetermined condition and a signal generator/transmitter in circuit with said switching means operable to generate and transmit a signal of fixed frequency responsive to actuation of said switching means.

The predetermined condition to which the switching means responds may be either a normal or an abnormal condition. In the former case, the signal would be generated under the normal condition but be cut-off responsive to detection of the abnormal condition.

The switching means is preferably actuable responsive to detection of a predetermined heat and/or temperature level. As such, the switching means may be embodied in a "rate of rise" type thermal detector head or in a "fixed temperature" type thermal detector head. Thus, the switching means may be actuated pneumatically (responsive to gas expansion within a chamber) or through deflection of a bimetallic strip. Alternatively, and by way of further example, the switching means may be actuable responsive to deflection of a predetermined smoke level present in the environment of the detector head.

The signal generator/transmitter preferably comprises a transistor oscillator circuit which is energised (responsive to the switch actuation) by self contained dry cell type batteries.

There is further provided in accordance with the present invention, a detector/indicator device comprising a detector head substantially as above defined and at least one remote receiver adapted to receive and give indication of signals transmitted by said detector head.

The detector/indicator device has particular application in a fire alarm system in multistory buildings. As such, a plurality of the detector heads may be strategically placed at points at each level of the building for transmission of signal(s) to one or more receivers located at each level. The receivers at the various levels may then be coupled through a suitable transmission line with a single display panel arranged and adapted to give an audible and/or visual indication of signal transmission.

As above stated, the present invention may also be utilized to accurately locate the position of a fire at specific areas on any one floor of a building. In such case there would be a single receiver for one or for each of a number of groups of detectors at any one level of the building.

Preferably, a signal time delay device is located in circuit between the or each receiver and the coupling to the display panel. The function of the delay device is to prevent transmission of the signal from the receiver to the display panel for a predetermined period of time, thus guarding against initiation of an alarm (responsive to receipt of extraneous signals) other than responsive to constant transmission of the detector head signal for the predetermined time period.

The input signal frequency to the transmission line may be different or be individually coded for each level (or for different areas of each level) of a building and, to avoid detection of a detector head signal at one level or area of the building which emanates from a detector head at another level or area, signals of different frequency or individually coded signals may be generated at each level. In order to detect the level from which a signal emanates, a signal plus carrier may be generated at each detector head; the signal component being different for each level or area of the building but the carrier being the same for every level.

The detector/indicator device of the present invention lends itself for employment in buildings having demountable and movable partitions. A detector head together with its associated transmitter may be conveniently moved from one position to another with, for example, relocation of an office or file storage area upon any one floor of a building, without the customary need for relocation of electrical wiring. In order to guard against unauthorised relocation of a detector head however, a switching means may be incorporated in the body of the detector head in such a way that the transmitter is actuated if the unit is moved from its installed position.

A further significant application of the thermal detector/indicator device is in older type multistory buildings which do not have provision in the ceiling of each level for location of concealed cable trunking. The detector head of the invention may be simply mounted in strategic positions to the ceilings without any requirement for ancillary wiring.

Although the invention is herein described with reference to fire detection, it need not be so limited. The present invention is equally applicable to such application as where, for example, a predetermined temperature drop is to be detected.

Figure 5:
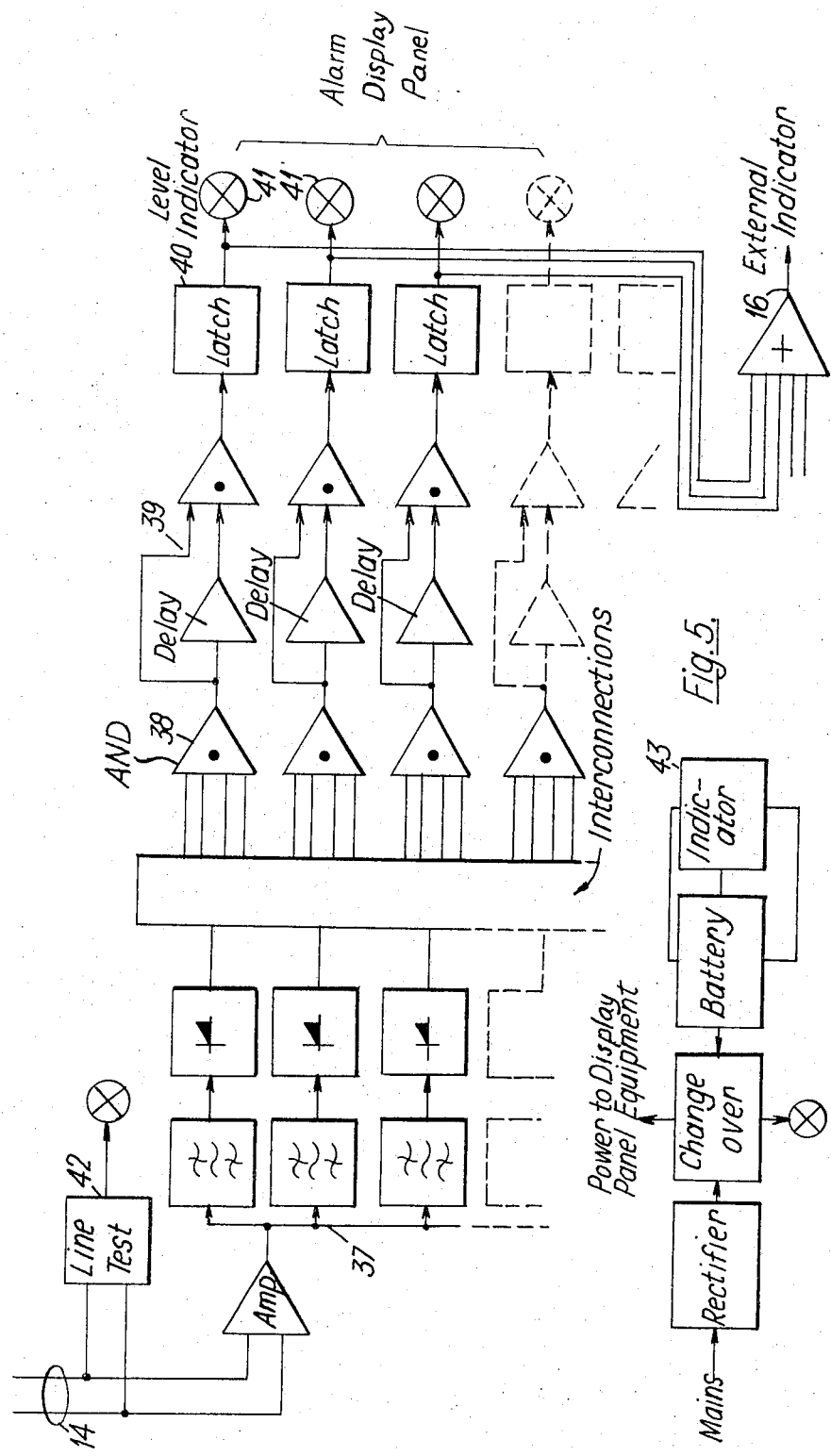

The invention will be more fully understood from the following description of a preferred embodiment of a thermal detector/indicator system for location in a multistory building. Such system is illustrated in the accompanying drawings wherein FIG. 1 is a schematic representation of a multistory building incorporating thermal detector/indicator system, FIGS. 2A and 2B show a thermal detector head mounted, (a) to a slab type ceiling and, (b) to a plaster board or similar type ceiling, FIG. 3 is a schematic diagram of a transmitter circuit associated with a detector head, FIG. 4 is a schematic diagram of a receiver circuit for receiving signals transmitted from a detector head at an associated floor level of the building, and FIG. 5 is a schematic diagram of a display panel for receiving signals transmitted from the receivers located at each level of the building.

As shown in FIG. 1, a number of thermal detector/transmitter heads 10 are mounted to the ceiling 11 at each level of a multistory building 12. The detector heads 10, which may function in a known manner to detect either an absolute rise or a rate-of-rise of temperature within a specific vicinity, are adapted to respond to a predetermined temperature level or rate of change in temperature level to actuate an associated switching means and, consequently, an associated signal transmitter.

A single receiver 13 is located at each level of the building for detection of a signal transmitted by a detector head at an associated level and the receivers are coupled via a transmission line 14 to a single display panel 15. The transmission line 14 may be housed in the floor-to-floor service trunking of the building.

The display panel 15 incorporates a local alarm system and it may be coupled by a transmission line 16 to an external alarm in a nearby fire control authority station.

Referring now to FIGS. 2A and 2B, the thermal detector/transmitter head 10 comprises, in each case, a thermal switch 17 mounted to a body 18 which is in turn secured to the ceiling 11. The body 18 houses a transmitter, described below, which is coupled to an antenna 19.

Each detector head 10 incorporates a dry cell battery for powering the associated transmitter and a battery charge level indicator 20 is mounted to the detector head for convenient viewing by an observer. A visual or audible alarm 21 may also be mounted to each detector head.

As shown in FIG. 3 the transmitter is adapted for emission of a coded signal in order to produce a response only at a corresponding receiver located on the same building level as an initiated detector head and to reduce the possibility of actuation of the receiver by extraneous signals. The coding may be achieved by amplitude or frequency modulation of a carrier signal, or by such other method as digital (time-division) modulation of a modulating tone or a carrier tone. Typically, amplitude modulation of a carrier by the designated two sinusoidal oscillator circuits would be sufficient to discriminate between three building levels, and a carrier frequency of about 27 MHz with modulating tones within the octave 400 to 800 Hz might be utilized.

In a typical multistory building, three modulating (transmitting) frequencies would be selected and used in pairs in the transmitters on three nearby floors. This would provide discrimination between three levels and, depending on the range of the transmitters in the actual environment, this group of three frequencies could then be repeated for another group of three levels, or more modulating frequencies might be employed to provide discrimination between different levels or level groups.

A latching mechanism 22 is connected across the thermal switch 17 to guard against failure of the thermal switch following energisation of the transmitter.

Reference is now made to the receiver 13, a typical arrangement of which is illustrated schematically in FIG. 4.

Each receiver is located within the transmission range of all of its associated transmitters and each receiver is energised by a no-break power supply 23. The power supply incorporates a mains-floating battery 24, together with means 25 and 26 to give visual indication when the battery is the power source and of the state of charge of the battery.

The receiver 13 is actuable by signals of adequate strength from any transmitter (detector) head 10 having the appropriate coded modulation, but not by signals having differently coded modulation.

The receiver unit comprises a super-heterodyne receiver 27. The base-band output from the receiver 27 will consist of two tones if a received signal emanates from a detector head 10 or a more complex signal in the case of detection of a spurious signal on the same carrier frequency. The base-band signal is fed to two band-pass filters 28 which are chosen to respond only to frequencies equal to the associated transmitter modulation frequencies. The outputs from the filters are detected by rectifiers (and low pass filters) 29 and fed to a logical AND gate 30, an output from which occurs only if both inputs are simultaneously present.

In order to protect the system from false alarms caused by extraneous signals, the transmission of a signal from the receiver 13 to the display panel 15 is inhibited until the receiver has detected an appropriately modulated signal continuously for a predetermined period of time. Signal transmission is inhibited in a delay unit 31. Thus, the signal passed to the delay unit is present only if an associated detector head transmission has been detected, or if an extraneous signal has two modulation components of just the right frequencies. The latter occurrence is unlikely to happen for more than a very short period very occasionally and to discriminate against it the time delay unit is employed such that the signals from both filters 28 must be simultaneously present for the predetermined time period.

An output signal from the receiver 13 is generated responsive to an input signal received from the detector heads 10, the output signal being initiated by switch 32 upon detection of a relevant input signal. Once initiated the output signal from the receiver will be transmitted until such time as the switch is manually reset. Also, a visual indicator 33 is provided to give indication of receiver activation, the indicator being connected in circuit with a latching mechanism 34 and being adapted for cancellation only by manual resetting of the latching mechanism.

A simple frequency division multiplex system may be employed for transmitting information of a detector signal at the receiver 13 to the display panel 15. In such case the receiver at an appropriate level would switch a single oscillator and the generated signal would be coupled to the transmission line 14. Then, in the display panel a series of band-pass filters, each tuned to a frequency corresponding to a different building level, would select from all signals on the line for initiation of alarm systems.

Preferably, however, a coded modulation scheme as indicated in FIGS. 4 and 5 is employed. Thus, each receiver 13 incorporates several (in this case three) oscillators 35 coupled to an amplifier 36. A unique set of oscillator frequencies is chosen to represent each level of the building and the operation of the receiver (after delay) at one level energises the oscillators 35 and couples them to the transmission line.

It will be appreciated that each receiver 13 may be coupled to the display panel by a direct switching line but that employment of the multiplex system permits sharing by all receivers of a common line-pair. In either case the purpose of the system is to provide identification at the display panel of any receiver which has been actuated.

In the display panel (FIG. 5) one or more relevant inputs is (or are) detected by tuned filters 37. The outputs from the filters (one for each frequency employed in any of the receivers) are combined logically, after rectification and filtering, so that outputs are obtained only for the pre-arranged combinations of frequencies representing the individual levels. This is performed by a series of AND gates 38, one for each level, having input interconnections with appropriate combinations of connections from the filters 37.

A delay system 39 is also incorporated in the display panel so as to improve the immunity of the system to extraneous signals.

The display panel is arranged to give an audible and a visual indication of signal transmission from the receivers, in such a way as to indicate the receiver(s) from which the signal(s) originate. Latching mechanisms 40 are located in circuit with each AND gate and with the appropriate level indicators 41 so as to guard against deenergisation of the system following its initiation.

The integrity of the transmission line 14 is monitored continuously at 42 by continuity or impedance measurement whereby indication will be given of any disturbance which occurs which would prevent detection of a signal from any receiver unit.

As in the case of the receiver, the display panel 15 and the transmission line is energised by a mains-floating battery power supply 43 which incorporates an operational mode and state of charge indicator.

I claim:

1. An alarm and indicating system, comprising:
   at least one detector head having an alarm switching means actuated in response to a predetermined alarm condition;
   a coded signal generator,
      said generator being controlled by the switching means for generating a coded R.F. signal in response to actuation of said switching means;
   at least one receiver means remotely located with respect to said detector head for receiving R.F. signals transmitted by said detector head,
      said receiver means decoding said coded signals to give an alarm output;
   a display panel having at least one alarm reception indicator and being remotely located with respect to said receiver;
   a transmission line connecting said receiver with said display panel; and,
   means at said receiver for transmitting an alarm signal to said display panel over said transmission line.

2. An alarm and indicating system as claimed in claim 1 in which a plurality of said detector heads and at least one said receiver are respectively disposed at respective levels of a multistory building,
   whereby at least one said receiver receives signals initiated by at least one said detector head disposed at an associated level of the building.

3. An alarm and indicating system as claimed in claim 2 and further including a power supply means comprising a mains-floating battery for energizing said display panel and each of said receivers.

4. An alarm and indicating system as claimed in claim 2 wherein a signal time delay means is interposed between said receivers and said transmission line for delaying initiation of indication of transmitted signal for a predetermined period of time.

5. An alarm and indicating system as claimed in claim 2 wherein each receiver has means to generate a frequency coded output signal, for transmission to the display panel, which is independent of but initiated by a signal transmitted by the respective alarm switching means.

6. An alarm and indicating system as claimed in claim 5 and further including a transmission line-pair common to all said receivers, the output signal from each receiver being coded differently from the other receivers on the line-pair.

7. An alarm and indicating system as claimed in claim 6 wherein each receiver output coded signal is modulated by a unique group of modulation frequencies to represent each level of the building.

8. An alarm and indicating system as claimed in claim 7 wherein, said display panel further includes means for detecting at least one signal input from at least one said receiver located at each level of the multistory building for indicating the multistory building level and level area source of signal transmission.

9. An alarm and indicating system as claimed in claim 2 wherein the signal transmitted from each said detector head associated with one said receiver is coded differently from the signal transmitted from the other said detector heads associated with another said receiver located within the transmitting range of the first mentioned detector heads.

10. An alarm and indicating system as claimed in claim 9 wherein the coded signal transmitted by each detector head comprises a carrier signal which is modulated by at least one modulating signal.

11. An alarm and indicating system as claimed in claim 9 wherein the coded signal transmitted by each detector head is modulated by two of at least three selected modulation frequencies, a different pair of modulation frequencies being employed for detector heads located at different levels of the building.

12. An alarm and indicating system as claimed in claim 9 wherein the coded signal transmitted by each detector head is modulated by two of at least three selected modulation frequencies, a different pair of modulation frequencies being employed for detector heads located at different level areas of the building.

* * * * *